US010367703B2

(12) United States Patent
Gibson et al.

(10) Patent No.: US 10,367,703 B2
(45) Date of Patent: Jul. 30, 2019

(54) ANALYSIS OF NETWORK TRAFFIC RULES AT A NETWORK VISIBILITY NODE

(71) Applicant: Gigamon Inc., Santa Clara, CA (US)

(72) Inventors: Simon H Gibson, Santa Clara, CA (US); Shehzad Merchant, Santa Clara, CA (US)

(73) Assignee: Gigamon Inc., Santa Clara, CA (US)

( * ) Notice: Subject to any disclaimer, the term of this patent is extended or adjusted under 35 U.S.C. 154(b) by 136 days.

(21) Appl. No.: 15/406,487

(22) Filed: Jan. 13, 2017

(65) Prior Publication Data

US 2018/0159898 A1 Jun. 7, 2018

Related U.S. Application Data

(60) Provisional application No. 62/428,953, filed on Dec. 1, 2016.

(51) Int. Cl.
*H04L 12/26* (2006.01)
*H04L 29/06* (2006.01)

(52) U.S. Cl.
CPC ........ *H04L 43/028* (2013.01); *H04L 63/0263* (2013.01); *H04L 43/04* (2013.01);
(Continued)

(58) Field of Classification Search
CPC ......... H04L 41/12; H04L 41/22; H04L 41/24; H04L 43/045; H04L 67/26; H04L 41/14; H04L 43/04; H04L 63/1408; H04L 12/2807; H04L 41/0213; H04L 41/042; H04L 41/044; H04L 41/0663; H04L 41/0806; H04L 41/0816; H04L 41/082; H04L 41/0853; H04L 41/0859; H04L 41/5035; H04L 41/5051; H04L 41/5058; H04L 41/5087; H04L 41/509; H04L 43/02; H04L 43/022; H04L 43/028; H04L 43/0811; H04L 43/12; H04L 43/18; H04L 43/50; H04L 61/6022; H04L 67/16;
(Continued)

(56) References Cited

U.S. PATENT DOCUMENTS

| 5,910,803 A | * | 6/1999 | Grau | ................ H04L 41/12 709/224 |
| 6,636,593 B1 | * | 10/2003 | MeLampy | ............ G06Q 20/04 340/9.16 |

(Continued)

*Primary Examiner* — Greg C Bengzon
(74) *Attorney, Agent, or Firm* — Perkins Coie LLP

(57) ABSTRACT

Techniques are disclosed for monitoring usage of network traffic rules applied by devices on a computer network. Operations in accordance with the disclosed techniques can be performed at one or more network visibility nodes that operate as part of a visibility fabric, for example for monitoring traffic on the network. In certain embodiments, packets associated with the traffic are received at a network visibility node communicatively coupled to the network that is operable to enable visibility across the network. The network visibility node can access network traffic rules that mirror the network traffic rules applied at devices on the network. The network visibility node can further process the received packets using the accessed network traffic rules to identify packets or flows of packets that satisfy criteria associated with the accessed network traffic rules.

18 Claims, 5 Drawing Sheets

(52) U.S. Cl.
CPC ............ *H04L 43/062* (2013.01); *H04L 43/12* (2013.01); *H04L 63/1425* (2013.01)

(58) Field of Classification Search
CPC . H04L 63/02; H04L 63/0227; H04L 63/0236; H04L 63/0245; H04L 63/0254; H04L 63/0263; H04L 63/1416; H04L 63/1425; H04L 63/18; H04L 63/30; H04L 63/302; H04L 63/306; H04L 69/26; H04L 45/02; H04W 16/18; H04W 24/08; H04W 40/248; H04W 84/18
See application file for complete search history.

(56) References Cited

U.S. PATENT DOCUMENTS

| | | | | |
|---|---|---|---|---|
| 6,981,035 B1* | 12/2005 | Goldberg | ............ | H04L 41/044 709/223 |
| 7,519,700 B1* | 4/2009 | Sapsford | ........... | G06F 17/30961 709/223 |
| 8,238,696 B2* | 8/2012 | Dart | ................. | G06F 17/30244 382/228 |
| 8,250,473 B1* | 8/2012 | Haynes | ............. | G06Q 30/0201 709/224 |
| 8,934,495 B1* | 1/2015 | Hilton | ..................... | H04L 67/36 370/401 |
| 8,953,458 B2* | 2/2015 | Leong | ..................... | H04L 43/10 370/241 |
| 9,571,296 B2* | 2/2017 | Nachum | ............. | H04L 12/4633 |
| 9,621,428 B1* | 4/2017 | Lev | ....................... | H04L 41/12 |
| 9,762,460 B2* | 9/2017 | Pawlowski | ........... | H04L 43/045 |
| 9,825,835 B2* | 11/2017 | Leong | ..................... | H04L 43/10 |
| 9,832,216 B2* | 11/2017 | Kaloroumakis | .... | H04L 63/1425 |
| 9,906,401 B1* | 2/2018 | Rao | ........................ | H04L 41/046 |
| 9,954,740 B2* | 4/2018 | Degioanni | ............. | H04L 41/14 |
| 9,960,953 B2* | 5/2018 | Sufleta | ................ | H04L 41/0654 |
| 9,967,150 B2* | 5/2018 | Nachum | ................. | H04L 41/14 |
| 9,973,474 B2* | 5/2018 | Hill | ..................... | H04L 63/0272 |
| 2003/0097438 A1* | 5/2003 | Bearden | .............. | H04L 41/0213 709/224 |
| 2003/0200347 A1* | 10/2003 | Weitzman | ................ | H04L 41/22 719/310 |
| 2005/0004942 A1* | 1/2005 | Madsen | .............. | H04L 41/0843 |
| 2006/0026682 A1* | 2/2006 | Zakas | ..................... | H04L 29/06 726/22 |
| 2007/0189189 A1* | 8/2007 | Andrews | ............. | H04L 12/4675 370/254 |
| 2008/0052628 A1* | 2/2008 | Bugenhagen | ....... | H04L 41/0896 715/736 |
| 2009/0138938 A1* | 5/2009 | Harrison | ................ | G06F 21/604 726/1 |
| 2009/0290513 A1* | 11/2009 | Swan | ................... | H04L 41/0213 370/255 |
| 2010/0232317 A1* | 9/2010 | Jing | .................... | H04L 12/2807 370/254 |
| 2013/0097662 A1* | 4/2013 | Pearcy | ................... | G06F 21/577 726/1 |
| 2013/0132850 A1* | 5/2013 | Subramanian | .......... | H04L 41/22 715/735 |
| 2013/0136138 A1* | 5/2013 | Miller | ..................... | H04L 67/14 370/395.53 |
| 2013/0246639 A1* | 9/2013 | Nedbal | .................. | H04L 63/101 709/228 |
| 2013/0272135 A1* | 10/2013 | Leong | .................. | H04L 41/0823 370/241 |
| 2014/0101467 A1* | 4/2014 | Jubran | ................ | H04L 41/0856 713/310 |
| 2015/0003296 A1* | 1/2015 | Fan | ..................... | H04L 41/0806 370/255 |
| 2015/0120856 A1* | 4/2015 | Bennett | ................... | H04L 47/10 709/213 |
| 2015/0319049 A1* | 11/2015 | Nachum | ................ | H04L 41/14 370/422 |
| 2015/0319070 A1* | 11/2015 | Nachum | ............. | H04L 12/4633 370/400 |
| 2015/0350095 A1* | 12/2015 | Raney | .................. | H04L 47/2441 709/223 |
| 2016/0020981 A1* | 1/2016 | Raney | ..................... | H04L 47/22 709/224 |
| 2016/0149943 A1* | 5/2016 | Kaloroumakis | ....... | G06N 7/005 726/23 |
| 2016/0249240 A1* | 8/2016 | Tzolov | .................. | H04W 24/08 |
| 2016/0285707 A1* | 9/2016 | Pawlowski | ........... | H04L 43/045 |
| 2016/0337204 A1* | 11/2016 | Dubey | .................... | H04L 41/22 |
| 2016/0373312 A1* | 12/2016 | El-Nasr | ................ | H04L 41/22 |
| 2017/0048116 A1* | 2/2017 | Anderson | ............. | H04L 43/028 |
| 2017/0078168 A1* | 3/2017 | Harris, Jr. | ............. | H04L 43/062 |
| 2017/0093640 A1* | 3/2017 | Subramanian | .......... | H04L 41/12 |
| 2017/0126500 A1* | 5/2017 | Eggen | ................ | H04L 41/0823 |
| 2018/0006996 A1* | 1/2018 | Nantel | ................ | H04L 12/2801 |
| 2018/0077071 A1* | 3/2018 | Raney | ................ | H04L 41/0893 |
| 2018/0159898 A1* | 6/2018 | Gibson | .................. | H04L 63/20 |

\* cited by examiner

ANALYSIS OF NETWORK TRAFFIC RULES AT A NETWORK VISIBILITY NODE

CROSS-REFERENCE TO RELATED APPLICATION(S)

This application is entitled to the benefit and/or right of priority of U.S. Provisional Application No. 62/428,953, titled, "ANALYSIS OF NETWORK TRAFFIC RULES AT A NETWORK SWITCH APPLIANCE," filed Dec. 1, 2016, the contents of which are hereby incorporated by reference in their entirety for all purposes. This application is therefore entitled to a priority date of Dec. 1, 2016.

TECHNICAL FIELD

The present disclosure generally relates to network traffic rules, and more particularly to analysis of the application of network traffic rules in a computer network.

BACKGROUND

With ever-increasing amounts of data traffic on modern computer networks, network monitoring and security measures play an increasingly important role in reducing the vulnerability of a network to intrusion, unauthorized access and other security or performance issues. Tools can be deployed in a computer network that process the network traffic and provide monitoring and security services. Examples of network tools include an intrusion detection system (IDS), an intrusion prevention system (IPS), a sniffer, a network monitoring system, an application monitoring system, a forensic storage system, an application security system, among others. However, tools are only as effective as the network traffic that they can see. Existing approaches involve deploying multiple editions of the same tool across a computer network to increase visibility of the network traffic. This approach can be expensive and difficult to scale and manage.

A network visibility node communicatively coupled between communicating nodes on a computer network can route packets to centralized tools for processing. To be more responsive to emerging security threats, many users of out-of-band tools that passively monitor traffic are moving to in-line deployments. In an in-line deployment, packets originating from one node on a computer network are routed through the tool before continuing on to another node on a computer network. In contrast, in an out-of-band deployment, copies of packets originating from one node are routed to the tool without passing the packet back to the network for transmission to an intended receiving node.

BRIEF DESCRIPTION OF THE DRAWINGS

The present disclosure is illustrated by way of example, and not by way of limitation, in the figures of the accompanying drawings and in which like reference numerals refer to similar elements. The figures of the accompanying drawings depict only example embodiments of the present disclosure and are therefore not to be construed as limiting. In the drawings.

DETAILED DESCRIPTION

Overview

A networked computing environment can include multiple devices connected over a computer network. For example, a packet-switched network may include multiple physical and virtual devices such as firewall devices, routing devices, switching devices, server devices, and end user devices. Each of these devices can include and apply rules that define the access, routing, and/or processing, of packets that form the network traffic over the network. As an example, a firewall device may include and apply a set of rules that include criteria for allowing or blocking certain inbound or outbound traffic. In such an example, the criteria associated with a firewall rule may be based on source or destination identifiers (e.g. an IP address, http address, etc.) associated with packets forming the traffic. Other devices may include rules that have other criteria. For example, a switch or router device may include a rule configured to direct certain traffic based on a transfer protocol designated in the packet information.

Network traffic rules associated with a particular device on the network are typically configured, implemented, and applied independently of the other devices on the network. At the design stage, a network architect can coordinate the implementation of network traffic rules across a particular network to an extent. However, given the number of devices on a particular network (dozens, hundreds, etc.), small changes (i.e. to the devices, or individual rules) will often result in the uncoordinated application of many independent network traffic rules across the network. This can lead to situations where rules are not used, conflict with each other, and/or are redundant, etc. From a network administrator's perspective, this distributed implementation presents an analysis and management challenge. Multiple devices on a given network may include their own management tools that a network administrator can use monitor usage of particular rules at those device. However, such decentralized monitoring makes it very difficult to gather insight into rules usage across the network. To address these challenges, the process of monitoring rules usage can be centralized through the use of techniques that enable visibility across a given network.

Figure 1:
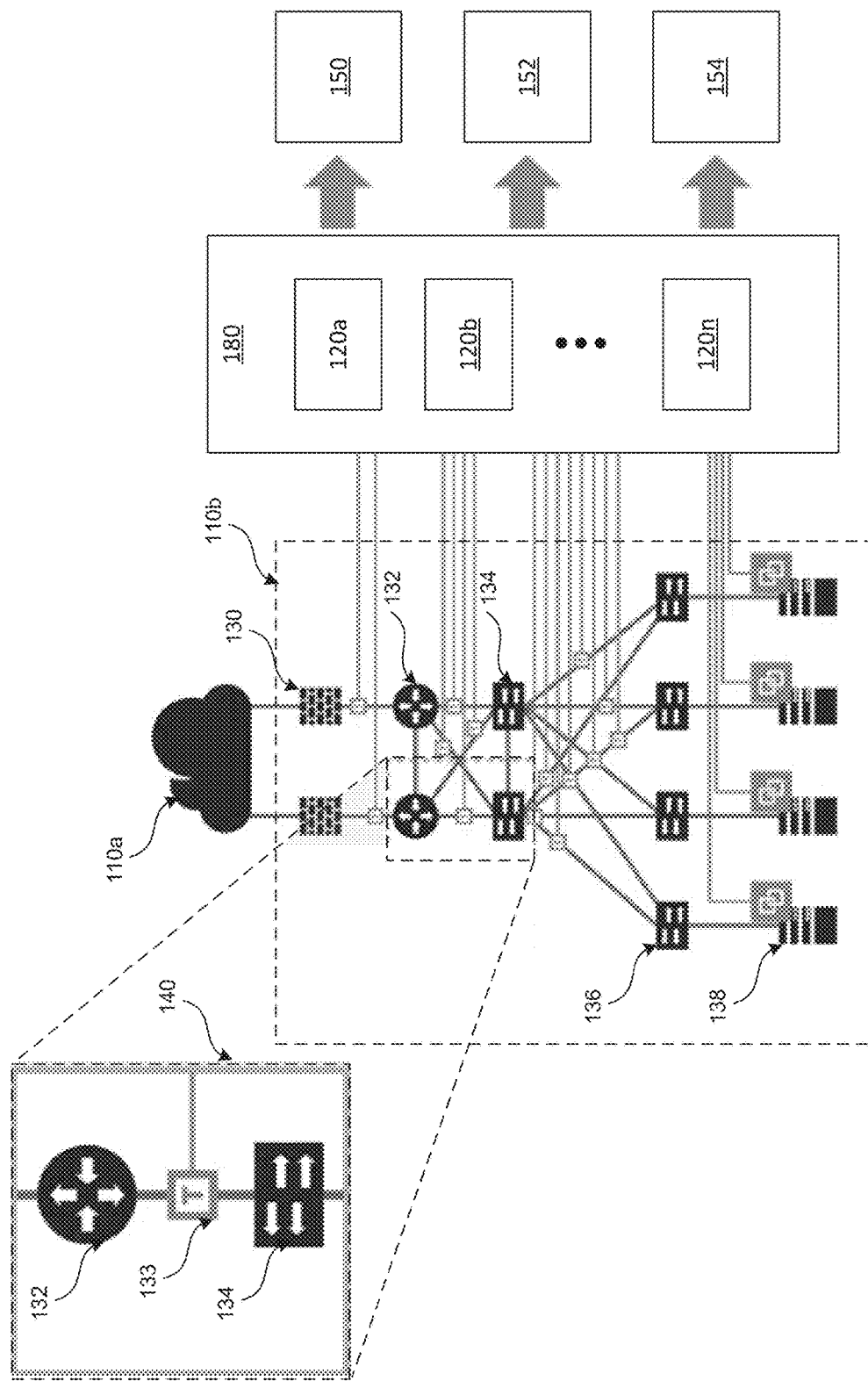
FIG. 1 shows an architecture diagram of an example system of networked computers.

FIG. 1 shows an architecture diagram of an example network 110b that includes multiple connected devices (as shown enclosed within the dotted line box labeled 110b. The example network 110b may be a private packet-switched network that includes one or more firewall devices 130, router devices 132, "spine" switch devices 134, "leaf" switch devices 136, and server devices 138. Each of the devices identified in FIG. 1 may either reference a physical device or virtual device implemented in software distributed across one or more physical devices. Private network 110b is shown connected to a public network 110a (e.g. the Internet) via the one or more firewall devices 130. Although not shown in FIG. 1, multiple client devices (e.g. personal computers, smartphones, etc.) may connect to network 110b directly via one or more routers 132 or switches 134, 136 or indirectly via the public network 110a. It shall be appreciated that the multiple devices on a given network can include both discrete physical devices and/or devices that are implemented at least in part virtually in software within a physical device and/or distributed across multiple physical devices.

As previously mentioned, the multiple devices (physical and/or virtual) on a given network may each apply their own set of network traffic rules. For example, one or more of fire wall devices 130, routers 132, switches 134, 136, and servers 138 may apply network traffic rules (e.g. for routing, security, policy enforcement, etc.). Each of the devices may have varying capabilities for monitoring the application of implemented rules. Some devices may have no capability to monitor rule usage, some devices may have a simple counter to track "hits" to a certain rule or set of rules, and some devices may have more advanced monitoring and reporting that, for example, provide insight into when the hits are occurring and the type of traffic triggering the hits. Even in a relatively simple network such as the example network 110*b* depicted in FIG. 1, the monitoring rule usage at each of the devices presents a challenge. First, monitoring at each device expends valuable processing resources at the device. Simple counters may not take much processing, but these provide limited insight. Second, information gathered through the monitoring must be conveyed in some way to a user such as a network administrator. The most efficient solution to convey such information is via a computing device connected to the rule applying devices (e.g. firewall 130, router 132, etc.) via network 110*b* and/or 100*a*. While this can provide some degree of centralized monitoring, the conveyance of this additional traffic across the network needlessly takes up valuable bandwidth. Even if reports are conveyed by the rule applying devices over the network to a central computing device, the disparate reports generated by each device may prove difficult for the user to reconcile thereby providing limiting insight into rule usage across the network.

To address these challenges, the process of rule monitoring or validation can instead be performed at a device or set of devices that enable visibility across the network 110*b*. As shown in FIG. 1, in some embodiments a network visibility fabric 180 may be implemented to enable such visibility. In some embodiments this visibility fabric can include the network infrastructure (both physical and virtual) that sits between a production network such as network 110*b* and one or more tools 150, 152, 154 that provide services related to network performance monitoring, application performance monitoring, security, management, etc. The visibility fabric 180 itself may include one or more physical and/or virtual device 120*a-n* that tap into a given network 110*b* to receive traffic to forward to tools 150, 152, 154 for processing. For example, the visibility fabric 180 depicted in FIG. 1 shows multiple taps across network 110*b* from which network traffic may be routed. A detail showing an example tap 133 between devices on a network is shown in detail 140. In some embodiments a visibility fabric 180 and associated tools 150, 152, 154 may be in-line with the network 110*b*. In such a configuration, packets originating from a source node on a network are routed through the visibility fabric 180 and associated one or more tools 150, 152, 154 before continuing on to a destination node. In other embodiments the visibility fabric 180 and one or more tools 150, 152, and 154 may be implemented to be out-of-band with the network. In this configuration, instead of routing packets through the visibility fabric 180 before continuing to a destination node, copies of packets transmitted over a network are pulled off the network (e.g. at the one more tap locations 133) for monitoring without impacting the end-to-end communication between nodes. Alternatively, in some out-of-band configurations, metadata may be extracted from the traffic transmitted over the network and this metadata may be forwarded to a network tool for processing without impacting end-to-end communications. In some embodiments, the visibility fabric 180 may include both in-line and out-of-band functionality.

As mentioned, a visibility fabric 180 including one more devices 120*a-n* can operate to provide traffic visibility across a network to enable services related to, for example, network performance monitoring, application performance monitoring, security, management, etc., using, for example, tools 150, 152, 154. The infrastructure implemented as part of a visibility fabric 180 can similarly be utilized to perform monitoring and validation of rules that that are being applied at one or more devices on the network. In some embodiments, this process can be performed by the one or more devices (physical or virtual) 120*a-n* forming the visibility fabric and/or by the one or more tools (physical or virtual) 150, 152, 154 that are communicatively coupled to the network via the visibility fabric 180. Further, in in-line configurations where the traffic of network 110*b* is routed via the visibility fabric 180, the process of applying the network traffic rules (e.g. allowing or blocking packets) can be completely or partially offloaded to the device(s) 120*a-n* of the visibility fabric 180 and/or the connected tools 150, 152, 154. In either case, such embodiments have the benefit of centralizing and normalizing the monitoring of network traffic rule usage, enabling more deep analysis and reporting of the usage of network traffic rules, centralizing the management and maintenance of network traffic rules, removing unnecessary reporting traffic from the network, and/or alleviating processing strain at the one or more devices (i.e. device 130, 132, 134, 136, and 138) operating on the network.

Example Network Visibility Node

Figure 2:
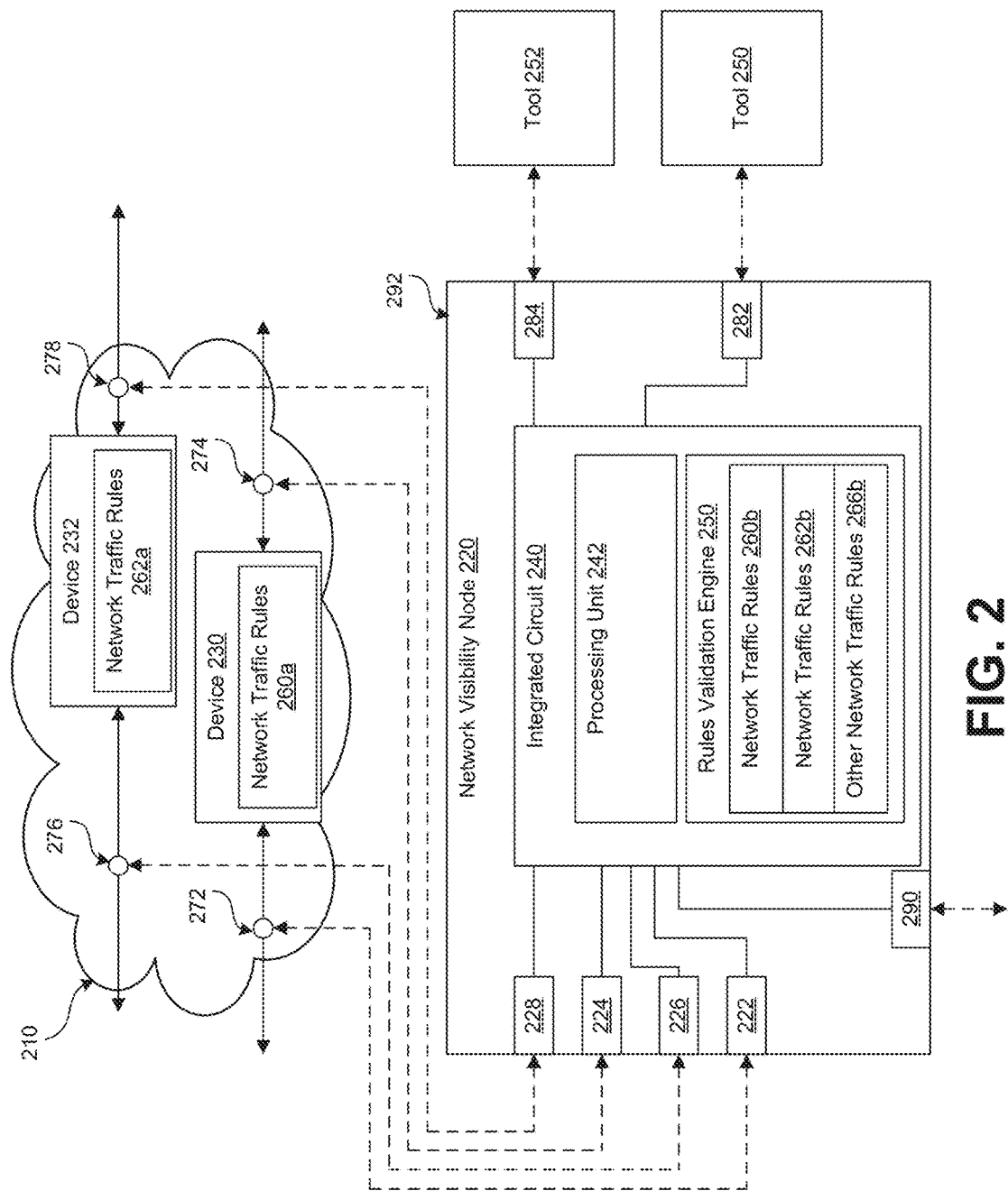
FIG. 2 shows an example network visibility node.

FIG. 2 illustrates an example network visibility node 220 in accordance with some embodiments. In some embodiments, the one or more devices 120*a-n* operating as part of the visibility fabric 180 described with respect to FIG. 1 may include a network visibility node 220 such as depicted in FIG. 2. It will be appreciated that the network visibility node 220 and associated systems are only examples provided for illustrative purposes.

The example network visibility node 220 includes a housing 292, one or more network ports 222, 224, 226, and 228, and one or more instrument ports 282 and 284. The network visibility node 220 also includes one or more integrated circuits 240 which in some embodiments may include one or more processing units 242. Note the network visibility node 220 with a housing 292 is depicted in FIG. 2 as physical device. However, in other embodiments a network visibility node with similar functionality to network visibility node 220 may be implemented at least partially in software (i.e. virtualized) within a physical device or distributed across multiple physical devices.

The network visibility node 220 also includes a rules validation engine 250 which along with processing unit(s) 242 may perform one or more of the operations described herein. The rules validation engine 250 is depicted separate from the processing unit 242, but may in some embodiments be integrated. Further processing unit 242 and rules validation engine 250 are depicted as part of integrated circuit 240, but may in some embodiments comprise separate modules. In the illustrated embodiments, the network visibility node 220 also includes other components, such as a Network PHY (not shown) coupled to each of the respective ports 222-228 and 282-284, wherein the Network PHYs may be considered to be parts of the integrated circuit 240. Alternatively, the Network PHYs may be considered to be components that are separate from the integrated circuit 240. The PHY is configured to connect a link layer device to a physical medium such as an optical fiber, copper cable, etc. In other embodiments, instead of the PHY, the network visibility node 220 may include an optical transceiver, or a SERDES, etc. The housing 292 allows the network visibility node 220 to be carried, transported, sold, and/or operated as a single unit. The ports 222-228 and 282-284 are located at a periphery of the housing 292. In other embodiments, the ports 222-228 and 282-284 may be located at other locations relative to the housing 292. Although four network ports 222, 224, 226, and 228 are shown, in other embodiments, the network visibility node 220 may include fewer or more than four network ports. Also, although two instrument ports 282, 284 are shown, in other embodiments, the network visibility node 220 may include fewer or more than two instrument ports. In addition, in some cases, the network visibility node 220 may not include any instrument ports for communication with one or more network tools (e.g. tools for network monitoring, security, etc.). Furthermore, in some cases, the instrument ports 282, 284 may be configured to communicate with one or more tools 250, 252, for example for network monitoring. Tools 250, 252 may be the same as or similar to tools 150, 152, 154 described with respect to FIG. 1. The one or more tools 250, 252 may include one or more network monitoring and/or security tools. In other cases, the one or more tools 250, 252 may be one or more non-transitory media, such as one or more storage devices, one or more databases, etc. In some embodiments the one or more tools 250, 252 may represent physical and/or virtual devices.

In an embodiment, during use, a first network port 222 of the network visibility node 220 is communicatively coupled (e.g., via a network 210) to a first node 272, and a second network port 224 is communicatively coupled (e.g., via the network 210) to a second node 274. Similarly, a third network port 226 of the network visibility node 220 is communicatively coupled (e.g., via a network 210) to a third node 276, and a fourth network port 228 is communicatively coupled (e.g., via the network 210) to a fourth node 278. Here the network 210 may include any combination of private and public networks (e.g. the Internet). For example, network 210 may represent the collection of networks 110a and 110b depicted in FIG. 1. In some embodiments, the network visibility node 220 is configured to receive packets from nodes 272, 274, 276, 278 via the network ports 222, 224, 226, 228. In the illustrated embodiments, the node 272 is at the input interface side of a first device 230 on the network 210 (e.g. a router, switch firewall device, etc.), and the node 274 is at the output interface side of the first device 230, or vice versa. Similarly, node 276 is at the input interface side of a second device 232 on the network 210 (e.g. a router, switch firewall device, etc.), and the node 278 is at the output interface side of the second device 230, or vice versa. With reference to FIG. 1, devices 230 and 232 may be similar to devices 130, 132, 134, 136, and 138 described with respect to FIG. 1.

In an embodiment, during use, the network visibility node 220 is configured to enable visibility into the traffic transmitted across network 210. Visibility can be enabled by "tapping" network traffic to and from devices such as devices 230, 232. For example, network visibility node 220 can be configured to tap packets being transmitted to the input interface of the routing device 230 via node 272. The term "tapping" in this context may in some cases refer to the routing of packets from network 210 to network visibility node 220. In an out of band configuration this may include copying packets being transmitted over the network 210 and transmitting those copied packets to network visibility node 220 without otherwise impacting the traffic over network 210. In an in-line configuration this may include re-directing the original traffic to network visibility node 220 before returning to the packets to the network 210 for transmission to a designated destination node. In either case, the means for tapping the network traffic can include for example, a physical or virtual tap device (e.g. similar to tap 133) configured to copy and/or redirect packet traffic. In some cases, devices 230, 232 may include port mirroring capabilities. For example any of nodes 272, 274, 276, 278 may represent a SPAN (switch port analyzer) port of any of devices 230, 232. In such embodiments, a device such as a switch sends a copy of all network packets seen on a particular port (or an entire VLAN) via a SPAN port, where the packet can be analyzed.

As previously described, in some embodiments, instrument ports 282, 284 of the network visibility node 220 are communicatively coupled to respective tools 250, 252. The tools 250, 252 may be directly coupled to the network visibility node 220, or communicatively coupled to the network visibility node 220 through a network (e.g., network 210). In some cases, the network visibility node 220 is provided as a single unit that allows the network visibility node 220 to be deployed at a single point along a communication path. In the illustrated embodiments, the network visibility node 220 (e.g., the integrated circuit 240) is configured to receive packets from nodes 272, 274, 276, 278 via the network ports 222, 224, 226, 228, and process the packets in accordance with a predefined scheme. In some embodiments, the integrated circuit 240 in the network visibility node 220 may analyze packets received from nodes 272, 274, 276, and/or 278 to determine information regarding the network traffic and pass (e.g. forward) that network traffic information downstream (e.g. to one or more network tools 250, 252) for processing. This network traffic information can include the packets themselves and/or extracted metadata based on the analysis. For example, in an embodiment the integrated circuit 240 in the network visibility node 220 may analyze packets received from nodes 272, 274, 276, and/or 278 to determine information (e.g., identity) regarding the input interface of the routing device 230, 232, information (e.g., identity) regarding the output interface of the routing device 230, 232, etc., and pass the determined information downstream for processing. For example, the integrated circuit 240 may pass the determined information for storage in a non-transitory medium. Alternatively, or additionally, the integrated circuit 240 may pass the determined information along with the associated packets received from one or more nodes to one or more tools 250, 252 that are connected to respective instrument port(s) 282, 284. Note that tools 250, 252 may not be necessary to the process of rule validation where that process is performed at the network visibility node 220.

In some embodiments, one or more of the network ports 222, 224, 226, 228 may be configured to receive normal packets (e.g., packets not from a virtualized network), as well as virtualized packets (e.g., packets with tunnel format that includes encapsulation of the original packets resulted from virtualization technology). In other embodiments, one or more the network ports 222, 224, 226, 228 may be configured to receive only non-virtualized packets. In further embodiments, one or more the network ports 222, 224, 226, 228 may be configured to receive only virtualized packets.

In one or more embodiments, the integrated circuit 240 may be or include any switch module that provides packet transmission in accordance with a pre-determined transmission scheme. In some embodiments, the integrated circuit 240 may be user-configurable such that packets may be transmitted in a one-to-one configuration (i.e., from one network port to an instrument port). As used in this specification, the term "instrument port" refers to any port that is configured to transmit packets to a tool (e.g. tool 250, 252), wherein the tool may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, a database, etc., or the instrument may be a pass-through device (i.e., it can receive packets, and transmit the packets back to the network visibility node 220 after the packets have been processed), such as an intrusion prevention system. In other embodiments, the integrated circuit 240 may be configured such that the packets may be transmitted in a one-to-many configuration (i.e., from one network port to multiple instrument ports). In other embodiments, the integrated circuit 240 may be configured such that the packets may be transmitted in a many-to-many configuration (i.e., from multiple network ports to multiple instrument ports). In further embodiments, the integrated circuit 240 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the network visibility node 220 so that the packets (or certain types of packets) are routed according to any one of these configurations. In some embodiments, the packet movement configuration is predetermined such that when the network visibility node 220 receives the packets, the network visibility node 220 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

In accordance with some embodiments, the integrated circuit 240 may have the functionalities of a conventional packet switch except that it provides visibility into various parts of a network. Thus, embodiments of the integrated circuit 240 may operate like a conventional managed packet switch, but providing packet monitoring function. This is accomplished by configuring the integrated circuit 240 to operate as a circuit switch under certain circumstances. In some embodiments, the configuring of the managed packet switch may be performed by utilizing a CPU interface of the switch to modify appropriate registers in the switch to allow for the desired operation. Also, in some embodiments, the integrated circuit 240 may be an "out-of-band" network switch, which is configured to obtain packets and pass them to a tool or to a network that is different from that associated with the original intended destination of the packets.

Also, the term "out-of-band" device/switch refers to a device that is not involved in a transmission of a packet (that is transmitted from node 1 and intended for reception by node 2) to the intended receiving node 2. In some cases, a device may be both an in-band device and an out-of-band device with respect to processing different packets. For example, the network visibility node 220 may be an in-band device if it receives a packet (intended for transmission from node 1 to node 2) from a network, and passes the packet back to the network (e.g., after the packet has been processed by a pass-through network tool) for transmission downstream to the node 2. The same network visibility node 220 may also be an out-of-band device if it receives another packet from the network, and does not pass the packet back to the network for transmission to the intended receiving node.

It should be noted that the integrated circuit 240 that may be used with the network visibility node 220 is not limited to the examples described above, and that other integrated circuits 240 with different configurations may be used as well. Also, in one or more embodiments described herein, the integrated circuit 240 may be implemented using a processor (e.g., a general purpose processor, a network processor, an ASIC processor, a FPGA processor, etc.).

In other embodiments, the network visibility node 220 may optionally include an additional processing unit (e.g., a processor) communicatively coupled to the processing unit 142. The additional processing unit may be used to perform additional packet processing, such as header stripping, in some embodiments. For example, in some embodiments, the additional processing unit may be configured to receive only packets with a tunnel format, such as that used in a virtualized network. In one implementation, the processing unit 242 or the integrated circuit 240 is configured to pass all packets with a tunnel format to the additional processing unit, and does not pass packets without any tunnel format (e.g., packets that are not associated with a virtualized network) to the additional processing unit. Upon receiving a packet with a tunnel format, the additional processing unit then removes one or more headers from the packet. By means of non-limiting examples, the additional processing unit may be configured to remove an outer MAC header, an outer IP header, an outer UDP header, or any combination of the foregoing, from the packet. In some embodiments, after the additional processing unit performs header stripping on the packet, the additional processing unit then passes the packet back to the integrated circuit 240. The integrated circuit 240 then transmits the packet to one or more of the instrument ports 282, 284 according to a pre-determined transmission scheme (e.g., one-to-one, one-to-many, many-to-one, many-to-many, etc.) as discussed previously. In other embodiments, in addition to performing packet stripping, the additional processing unit may also be configured to perform other packet processing functions on the received packet (e.g. a rules validation process in conjunction with rules validation engine 250). In some embodiments, the additional processing unit may be located outside the housing of the network visibility node 220. In other embodiments, the additional processing unit may be a part of the integrated circuit 240. For example, the additional processing unit may be considered to be a part of the processing unit 242. Also, in some embodiments, the additional processing unit may be a general purpose processor, a network processor, an ASIC processor, a FPGA processor, or any of other types of processor. In other embodiments, the additional processing unit may be any hardware, software, or combination thereof.

In the illustrated embodiments, the processing unit 242 is illustrated as a component of the integrated circuit 240. In some cases, the processing unit 242 may be one or more processors in the integrated circuit 240. In other cases, the processing unit 242 may be one or more circuit components that are parts of the integrated circuit 240. In other embodiments, the processing unit 242 may be a separate component from the integrated circuit 240. The processing unit 242 may be implemented using a processor, such as a general processor, a network processor, an ASIC processor, a FPGA processor, etc. In other embodiments, the processing unit 242 may be a field processor. In further embodiments, the processing unit 242 may be a network card. The processing unit 242 may be implemented using one or more processors, wherein one or more of the processors may be considered to be a part of the network visibility node 220 or not. Also, in some embodiments, the integrated circuit 240 may include ternary content-addressable memory (TCAM). The integrated circuit 240 may be configured to perform various packet processing functions, included but not limited to packet filtering, packet routing, packet switching, packet mirroring, packet aggregation, etc.

As shown in the figure, the network visibility node 220 further includes one or more I/O port(s) 290 for importing and exporting data. For example, in an embodiment port 290 may include a configuration port for receiving configuration information to thereby configure any of integrated circuit 240, processing unit 242, or rules validation 250. For example, in an embodiment, data is received at port 290 for configuring a switching fabric associated with integrated circuit 240 and/or processing unit 242 according to a user-configured transmission scheme. In some embodiments data related to the rules 260b, 262b, 266b used by rules validation engine 250 to process received packets may be received via port 290. In some embodiments outputs generated by any of integrated circuit 240, processing unit 242, or rules validation engine 250 may be transmitted via port 290. For example, rules validation reports generated by rules validation engine 250 may be exported to another computing device communicatively coupled (e.g. via a network) to port 290.

In some embodiments, I/O port(s) 290 may be a separate and different port from the other network ports 222, 224, 226, 228 and instrument ports 282, 284. In other embodiments, the port 290 may be a network port, like the network ports 222, 224, 226, 228, or may be implemented using one or both of the network ports. In such cases, in addition to receiving configuration information and exporting generated outputs, the port 290 may also receive network traffic that is being communicated between nodes (e.g., nodes 272, 274). Also, in further embodiments, the network visibility node 220 may include multiple I/O ports 290 for transmitting and receiving information.

Example Process for Rules Validation

Figure 3:
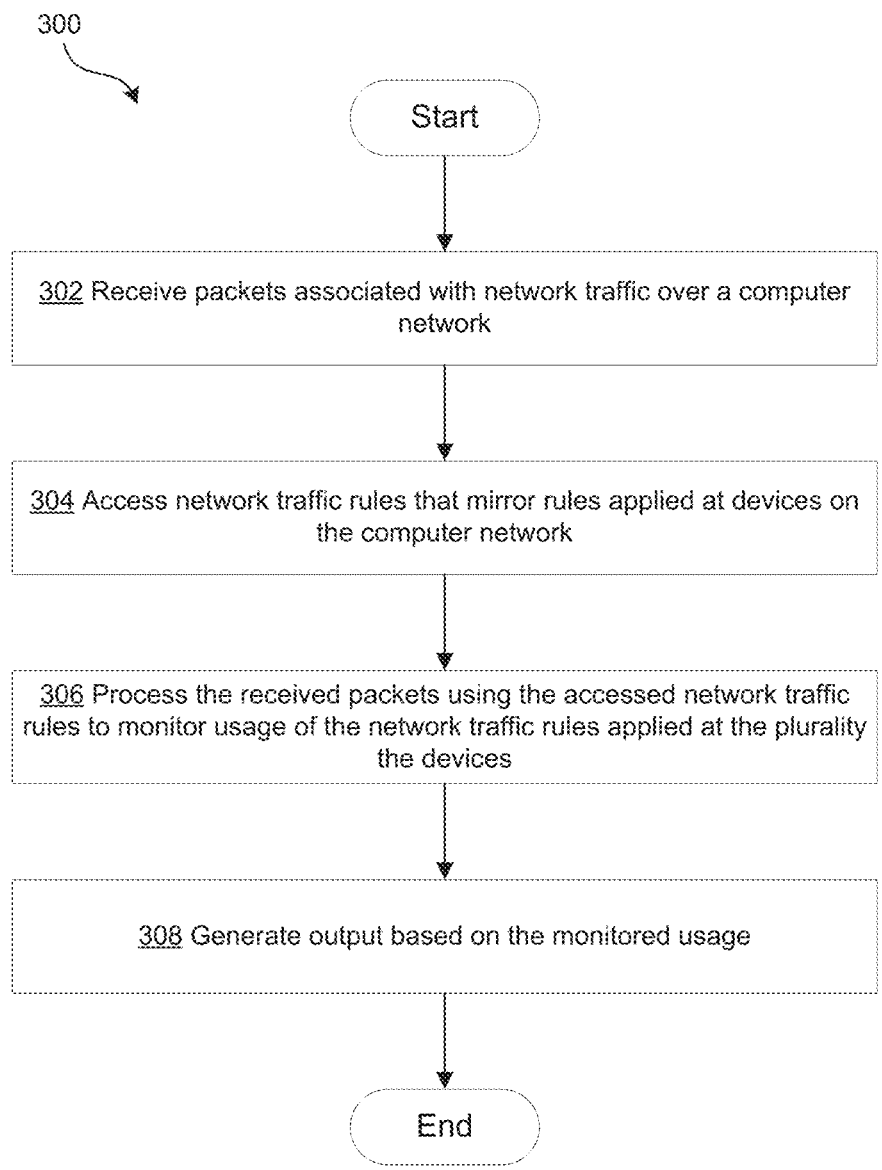
FIG. 3 is a flow diagram illustrating an example process for analyzing usage of network traffic rules.

FIG. 3 is flow chart that illustrates an example process 300 for rules validation, according to some embodiments. For clarity and illustrative purposes process 300 is described with reference to the network visibility node 220 of FIG. 2. However, in other embodiments, the process 300 may be performed by other types of devices (e.g. tools 250, 252), or other devices having different configurations than as those described with reference to FIG. 2.

Example process 300 begins at step 302 with receiving packets associated with network traffic over a computer network. Specifically, with reference to FIG. 2, the network visibility node 220 receives a packets that are tapped from a network 210 that includes one or more devices 230, 232 (e.g. routers, switches, firewall). As used in this specification, the term "tap" or similar term, such as "tapped", may refer to the act of receiving packet or a copy of a packet from a network, wherein such act may be performed by any device (which may or may not be considered a "tap"). In some cases, the act of receiving the packets may be performed by any of the network ports 222, 224, 226, 228, integrated circuit 240, processing unit 242, or rules validation engine 250. In the example configuration depicted in FIG. 2, the network visibility node 220 may receive packets (or copies of packets) destined for an input interface of devices 230, 232, from nodes 272, 276 (respectively) via network ports 222, 226 (respectively). Similarly, the network visibility node 220 may receive packets (or copies of packets) exiting an output interface of devices 230, 232, from nodes 274, 278 (respectively) via network ports 224, 228 (respectively). In other cases, the act of receiving the packets may be performed by another processing unit at the network device 100. Also, in some cases, the act of receiving the first packet may be performed by a network port (e.g., network port 112) at the network visibility node 220. After the first packet is received by the a network port, the network port then passes the packet downstream to another component (e.g. rules validation engine 250) in the network visibility node 220 for processing.

The process continues at step 304 with accessing network traffic rules that mirror rules applied at devices on a computer network. For example, as previously mentioned with respect to FIG. 1, multiple devices 130, 132, 134, 136, 138 on a computer network 110b may apply multiple network traffic rules. In this context "apply" means carry out the processing, routing, blocking, allowing, etc. of network traffic according to the criteria of the rules. Consider again the example illustrated in FIG. 2. As shown in FIG. 2, devices 230 and 232 both include and apply corresponding sets of network traffic rules 260a and 262a (respectively). For example, device 230 may be a firewall device and apply rules to block or allow packets according to certain criteria (e.g. source/destination identifiers). To validate (i.e. monitor) usage of these rules 260a and 262a at devices 230 and 232 (respectively), the network visibility node (e.g. specifically rules validation engine 250) may access rules 260b and 262b that mirror rules 260a and 262a as well as other rules 266b that mirror rules applied at other devices in the network 210. In some embodiments accessing the mirrored rules 260b, 262b may include any of receiving an input including the network traffic rules (e.g. an import of an exact copy of rules 260a, 262a), receiving programming instructions defining the network traffic rules (e.g. as manually entered by a network administrator), or actively pulling the network traffic rules from any of the plurality of devices applying the network traffic rules (e.g. rules 260a, 262a). For example, network visibility node 220 may be configured to crawl devices that operating on the network 210 for rules to validate. In some cases this may involve automatically pulling (e.g. downloading) the rules to the network visibility node or providing an output to a user indicating the presence of the rules and prompting the user to input to the network visibility node manually.

In some embodiments accessed rules 260b, 262b, 266b may be stored as instructions in any type of non-transitory storage medium associated with or accessible to network visibility node 220. In FIG. 2, rules 260b, 262b, 266b are shown as part of rules validation engine 250 and indirectly as part of integrated circuit 240, implying that the rules are stored within these components. While this may be the case in some embodiments it is not an all in embodiments. In some embodiments these rules 260b, 262b, 266b may be stored at an external computing or dedicated storage device and accessed e.g. via any of an I/O port 290, network port 222, 224, 226, 228, or instrument port 282, 284.

The process continues at step 306 with processing received packets using the accessed network traffic rules to monitor usage of network traffic rules as applied at the devices on the computer network. In some embodiments, processing the packets to the monitor usage can include identify "hits" and/or "misses" to the rules. In this context, "hits" refer to packets or flows of multiple packets that satisfy a criterion associated with the network traffic rules. Conversely a "misses" refer to packets or flows of packets that do not satisfy such a criterion associated with the network traffic rules. For clarity, embodiments are described herein that refer to processing packets to identify hits, however this is not to be construed as limiting. In other embodiments packets may be processed to identify misses alternatively or in addition to hits. Consider again the example depicted in FIG. 2. Here as packets arrive at devices 230, 232 on network 210 they are subject to the application of respective rule sets 260a, 262a. If any of those arriving packets or flows of packets satisfy criteria associated with those rules it may lead to allowing, blocking, rerouting, etc. of those packets. Regardless of the effects of the rules, visibility into network 210 enabled by network visibility node 220 (possible operating as part of a visibility fabric) allows for analyzing the traffic against those same sets of rules in parallel and at a central location to monitor usage of the rules.

As previously discussed, network visibility node 220 may be out-of-band with certain traffic on network 210 and therefore may receive tapped copies of the packets passing through devices 230, 230. The network visibility node monitors usage of the rules 260a, 262a at devices 230, 232 by analyzing the copied packets against the mirrored rules 260b, 262b. This both centralizes and normalizes monitoring and reporting, but also relieves the devices 230, 232 from having to monitor usage.

In other embodiments, network visibility node 220 may be in-line with certain traffic on the network and may therefore receive the tapped packets for processing before returning to the network 210 for transmission to the eventual destination node. In such embodiments, rules applied at devices 230, 232 can be offloaded for application at network visibility node 220. In other words, in addition to monitoring the usage of network security rules, the network visibility node 220 can further carry of the traffic routing, blocking, allowing, etc. actions specified by the rules.

In some embodiments, step 306 of process 300 may include analyzing identified hits and/or misses to identify redundancies, conflicts, over use, underuse etc. in the network traffic rules applied on the network 210. For example, consider that devices 230 and 232 are arrange such that all of the traffic passing though device 230 also passes through 232. As mentioned each device may apply its own rules set. Accordingly, in some cases packets passing through the two devices may generate two hits against similar criteria. The similar criteria for these two rules sets would likely be redundant depending on the requirements of the network. Without preexisting knowledge of the rule sets for each device or close analysis of the two devices for specific types of traffic, a network administrator may never identify the redundancy. Instead by processing the packets (or copies of packets) at the network visibility node 220 against mirrored rule sets 260b, 262b, patterns can be uncovered and redundancies identified.

Conflicts can similarly be identified. Consider again a case in which packets route through device 230 and 232 (in that order). If the rules 260a of device 230 include criteria that allow a particular packet and the rules 262a of device 232 include criteria that allow the particular packet that may indicate that the criteria of those tow rules conflict with each other. Again, this is readily identified through analysis at a central location such as at network visibility node 220.

Usage patterns (e.g underutilization or overutilization) can similarly be identified. As a network is built out over time devices are added and remove to the point that a network administrator may not have a clear picture of what rules are actually affecting the traffic and which rules are perhaps lying dormant. By processing at network visibility node 220, the hits and/or misses can be tracked over time and analyzed for patterns of usage (e.g. average hits per period of time, identifiable patterns of hits per period of time, time since last hit, etc.).

Process 300 may continue, in some embodiments, at step 308 with generating an output based on the monitored usage of the network traffic rules applied at the plurality of devices. For example, the output may be a report that is generated for display to a user via a computing device communicatively coupled to network visibility node 220 (e.g. via I/O port 290). In some embodiments, a generated report may include simple counts or statistical data regarding hits and/or misses to certain network traffic rules. In some embodiments, generated reports may include more detailed information regarding the traffic resulting in the hits and/or misses. For example, a generated output may include information regarding packets associated with a hit and/or a miss, including, but not limited to, a source identifier (e.g. source port ID, source mac address, source IP address, source URL, etc.), a destination identifier (e.g. destination port ID, destination mac address, destination IP address, destination URL, etc.), a protocol identifier (e.g. TCP, UDP, etc.), or any other data associated with the packets (e.g. byte count, checksum, timestamp, etc.). This information may be pulled from the processed packets.

In some embodiments, generation of outputs at step 308 may be based on one or more reporting criteria. For example, in some cases a report may automatically be generated if a tracked plurality of hits over a particular period of time satisfies or doesn't satisfy a reporting criterion. Consider a case where a network administrator is trying to identify underutilization (e.g. non-use) of network traffic rules on a network 210 that they are managing. Such information may be of importance to a network administrator because an unused rule may pose a risk to the security of the network if not closed, assuming that the unused rule had a valid purpose for implementation. The network administrator can specify a reporting criterion that automatically causes generation of a report if, for example, any of the network traffic rules applied across the network 210 have not rendered a hit within a particular period of time (e.g. a week). The automatically generated report may include a summary of the underutilized rules identified that fit this reporting criterion as well as information regarding the device applying the rules and traffic that was subject to application of the rules. The network administrator can then interpret these indications of underutilization of the network traffic rules and take action as necessary. For example, in some cases, non-use or limited use of a network traffic rule may just indicate that traffic that would satisfy the criteria of such rules is not present on the network. However, in some cases, the non-use or limited use of network traffic rules may indicate that the appropriate network traffic is not being routed through the device implementing the rule and that this may represent a network security risk. Based on the generated report, a user (e.g. network administrator) may take corrective action to mitigate the risk, for example by modifying aspects of the network and/or adjusting the underutilized rule. As explained below, in some embodiments, generated reports may include recommended actions to mitigate risks posed by the underutilization of certain network traffic rules.

In some cases outputs are generated in response to user requests (i.e. queries). For example, as packets are processed at network visibility node 220 to identify hits, a log of this processing may be automatically generated and stored (at the network visibility node 220 or at other storage device(s). In an embodiment a user may input a selection of a particular network traffic rule of the accessed set of network traffic rules. Alternatively, the user may select, for example, a particular period of time, a particular category of traffic, a particular device, etc. In response, the network visibility node 220 may generate and output a report including information on hits pertaining to the user's selection. As previously mentioned, the information can include simple counts or hits statistics, but may also include more detailed information regarding the packets, devices, etc. associated with the hits.

Although not shown in FIG. 3, in some embodiments the packet traffic received at network visibility node 220 may be analyzed to modify or recommend modifications to the rules. For example, as previously described a network visibility node 220 may be part of a visibility fabric 180 that sits between a production network 110*b* and one or more network tools 150, 152, 154. Accordingly, in some embodiments, network traffic information including at least some of the packets received at a network visibility node and/or metadata extracted from the packets, can be forwarded via a switch fabric of integrated circuit 240 and any of instrument ports 282 or 284 to an external network tool 252, 250 communicatively coupled to the network visibility node 220 for processing. The network traffic information is then processed, perhaps along with rules 260*b*, 262*b*, 266*b* at the tool 250, 252 which may generate feedback information regarding application of the rules. For example, the tools may identify conflicts, redundancies, underutilization, etc. The network visibility node 220 then receives the feedback information from the network tool, for example, via instrument ports 282, 284. The network visibility node 220 can then output the feedback information, for example, via port 290. Alternatively or in addition, the network visibility node 220 may generate commands to reconfigure the rules 260*a*, 262*a* at devices 230, 232 (and also mirrored rules 260*b*, 262*b*) based on the feedback information. For example, the rules may be reconfigured (i.e. modified, edited, replaced, etc.) to correct a redundancy or a conflict. These commands to reconfigure the rules at devices 230, 232 may be transmitted via any of network ports 222, 224, 226, 228.

Example Deployment in a Network Environment

Figure 4:
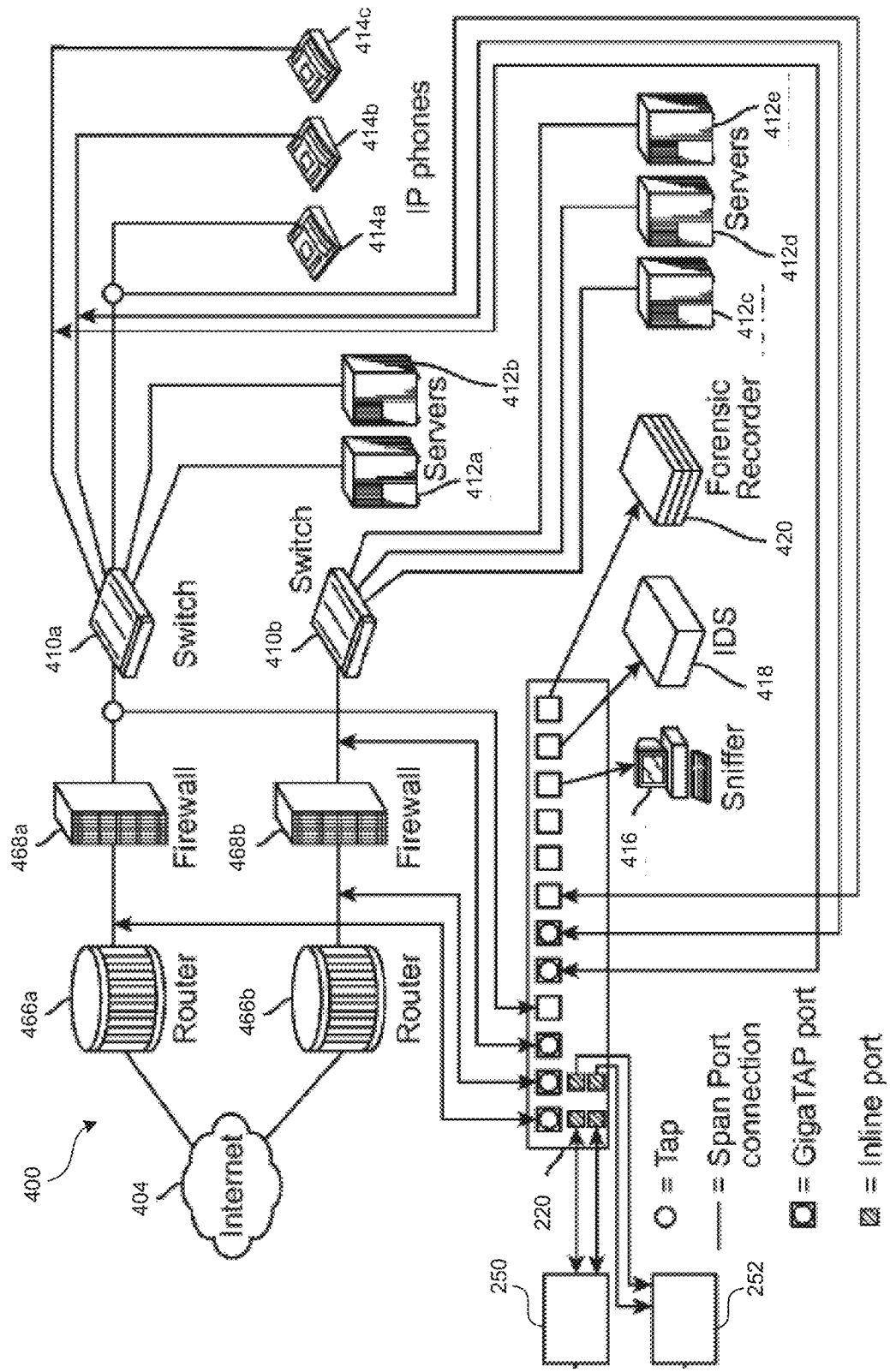
FIG. 4 shows the deployment of the network visibility node of FIG. 3 in a network environment.

FIG. 4 shows the deployment of a network visibility node (e.g. network visibility node 220) in a network environment 400 in accordance with some embodiments. The Internet 404 is coupled via routers 466*a-b* and firewalls 468*a-b* to two switches 410*a* and 410*b*. Switch 410*a* is coupled to servers 412*a-b* and IP phones 414*a-c*. Switch 410*b* is coupled to servers 412*c-e*. A sniffer 416, an IDS 418 and a forensic recorder 420 (collectively, "non-pass through instruments") are coupled to the network visibility node 220. As illustrated in FIG. 4, there is a reduction on the number of non-pass through instruments in this deployment as compared to a conventional configuration (in which there may be one or more non-pass through instruments between router 466*a* and firewall 468*a*, one or more non-pass through instruments between firewall 468*a* and switch 410*a*, one or more non-pass through instruments between router 466*b* and firewall 468*b*, and firewall 468*b* and switch 410*b*) because the same non-pass through instruments can now access information anywhere in the network environment 400 through the appliance 220. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 414*a-c* can be easily configured to be sent to an IDS 418. It is also possible that traffic inside a particular IP phone 414*a-c* connection can be sent to a sniffer 416, and Intrusion Detection System 418 and a forensic recorder 420 simultaneously via the one-to-many function.

In some embodiments, when using the appliance 120, one or more non-pass through instruments (such as IDS, sniffer, forensic recorder, etc.) may be connected to instrument port(s), and one or more pass through tools 250, 252 (e.g., IPS) may be connected to other instrument port(s) (e.g., in-line port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the appliance 220, the appliance 220 can compare whether the IDS or the IPS sees more threats, and/or can have a redundant protection such that if the IPS misses any threat, the IDS may pick it up.

Example Processing System

Figure 5:
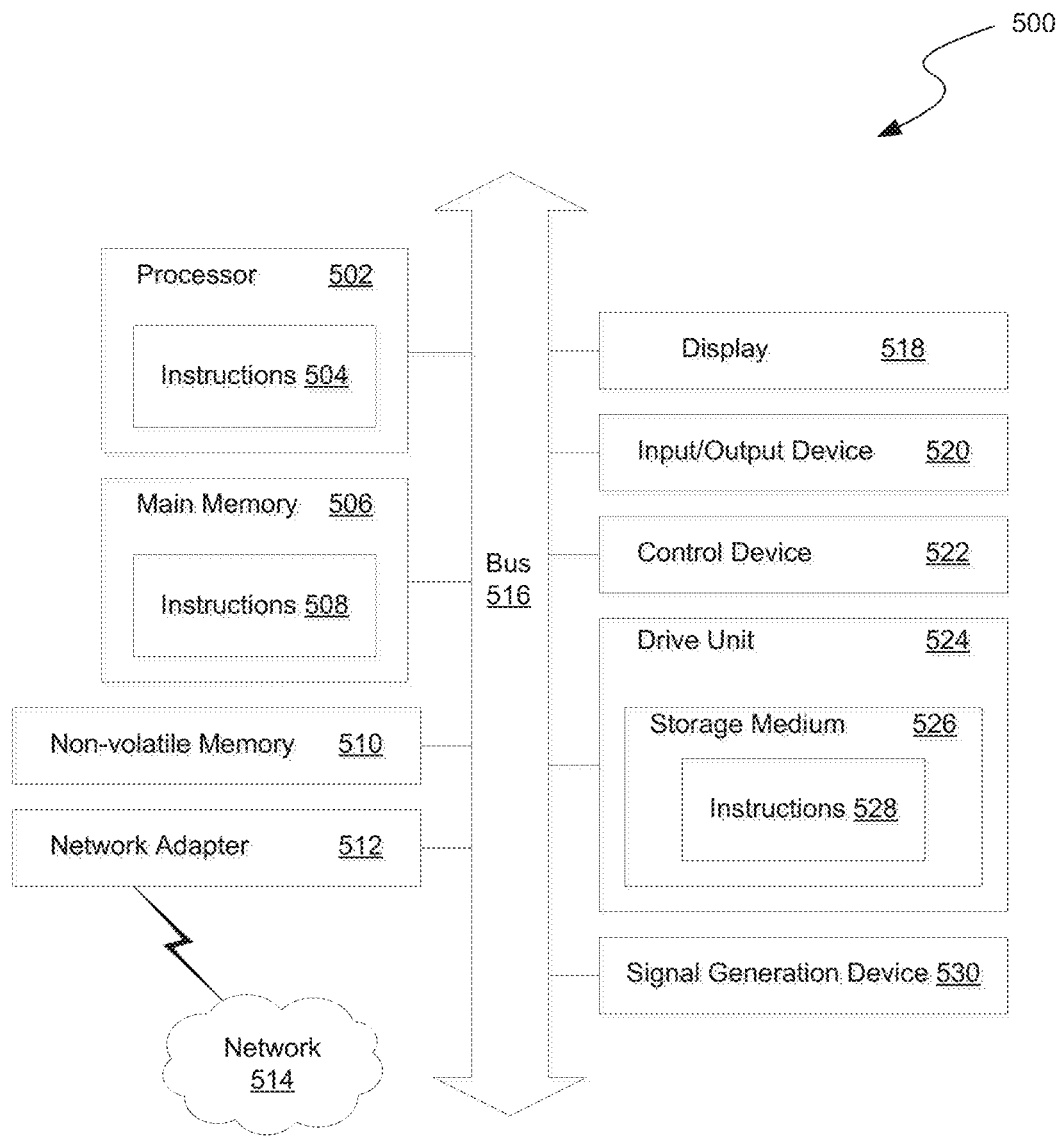
FIG. 5 is a block diagram illustrating an example computer processing system in which at least some operations described herein can be implemented.

FIG. 5 is a block diagram illustrating an example of a processing system 500 in which at least some operations described herein can be implemented. As an example, at least a portion of the processing system 500 may be included in a network appliance 220 (in that case, the processing system 500 may not include a display 518, but could instead include a switching fabric and one or more network ports). The processing system 500 may include one or more central processing units ("processors") 502, main memory 506, non-volatile memory 510, network adapter 512 (e.g., network interfaces), display 518, input/output devices 520, control device 522 (e.g., keyboard and pointing devices), drive unit 524 including a storage medium 526, and signal generation device 530 that are communicatively connected to a bus 516. The bus 516 is illustrated as an abstraction that represents any one or more separate physical buses, point to point connections, or both connected by appropriate bridges, adapters, or controllers. The bus 516, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of the network appliance, such as the switching fabric, network port(s), tool port(s), etc.

In various embodiments, the processing system 500 operates as a standalone device, although the processing system 500 may be connected (e.g., wired or wirelessly) to other machines. For example, the processing system 500 may include a terminal that is coupled directly to a network appliance. As another example, the computing system 500 may be wirelessly coupled to the network appliance.

In various embodiments, the processing system 500 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 506, non-volatile memory 510, and storage medium 526 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 528. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 504, 508, 528) set at various times in various memory and storage devices in a computer, and that, when read and executed by one or more processing units or processors 502, cause the processing system 500 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 510, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 512 enables the processing system 500 to mediate data in a network 514 with an entity that is external to the processing system 500, such as a network appliance, through any known and/or convenient communications protocol supported by the processing system 500 and the external entity. The network adapter 512 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 512 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
receiving, at a network visibility node communicatively coupled to a computer network, a plurality of packets associated with network traffic over the computer network, the network traffic associated with communications among a plurality of devices over the computer network, the plurality of devices not including the network visibility node, wherein the network visibility node operates out-of-band with the computer network;
accessing, by the network visibility node, a first set of network traffic rules configured to be applied to the network traffic, wherein the first set of network traffic rules mirror a second set of network traffic rules applied by at least one of the plurality of devices, wherein accessing the first set of network traffic rules includes any one or more of:
receiving an input including the first set of network traffic rules;
receiving programming instructions defining the first set of network traffic rules; or
actively pulling the first set of network traffic rules from any of the plurality of devices applying the network traffic rules; and
processing, by the network visibility node, the received plurality of packets using the first set of network traffic rules to monitor usage of the second set of network traffic rules, by tracking hits and/or misses of the plurality of packets received at the network visibility node against the first set of network traffic rules over a period of time.

2. The method of claim 1, where the at least one of the plurality of devices includes any of a switch, a router, or a firewall device communicatively coupled to the computer network.

3. The method of claim 1, wherein the network visibility node is communicatively coupled to the computer network via any of a network tap or a packet mirroring port at any of the plurality of devices.

4. The method of claim 1, wherein the network visibility node is part of a visibility fabric, wherein the visibility fabric is communicatively coupled to at least one network tool, and wherein the visibility fabric is operable to enable visibility across the computer network by routing network traffic information to the at least one network tool, the network traffic information including any of:
   at least some of the received plurality of packets; or
   metadata extracted from at least some of the received plurality of packets.

5. The method of claim 1, wherein processing the received plurality of packets using the first set of network traffic rules to monitor usage of the second set of network traffic rules includes any of:
   identifying a hit indicative of a packet or flow of packets included in the received plurality of packets that satisfies a rule criterion associated with the first set of network traffic rules; or
   identifying a miss indicative of a packet or flow of packets included in the received plurality of packets that does not satisfy a rule criterion associated with the first set of network traffic rules.

6. The method of claim 1, further comprising generating an output based on the monitored usage of the second set of network traffic rules.

7. The method of claim 6, wherein the output includes information regarding a packet or flow of packets of the received plurality of packets, the information including any of:
   a source identifier;
   a destination identifier;
   a protocol identifier; or
   a timestamp.

8. The method of claim 1, further comprising:
   generating an output that includes statistical information based on the tracked plurality of hits and/or misses.

9. The method of claim 1, further comprising:
   automatically generating an output if the tracked plurality of hits and/or misses over the period of time satisfies a specified reporting criterion.

10. The method of claim 1, further comprising:
    receiving a user input selecting a particular network traffic rule of the first set of network traffic rules; and
    generating an output, in response to the selection, including information regarding usage of the particular network traffic rule.

11. The method of claim 1, further comprising:
    receiving a user input selecting a particular period of time; and
    generating an output, in response to the selection, including information regarding usage of the first set of network traffic rules within the particular period of time.

12. The method of claim 1, wherein processing the received plurality of packets using the accessed network traffic rules to monitor usage of the second set of network traffic rules includes:
    analyzing identified hits and/or misses associated with the accessed network traffic rules to identify a redundant network traffic rule.

13. The method of claim 1, wherein processing the received plurality of packets using the first set of network traffic rules to monitor usage of the second set of network traffic rules includes:
    analyzing identified hits and/or misses associated with the first set of network traffic rules to identify two or more network traffic rules that conflict with each other.

14. The method of claim 1, wherein processing the received plurality of packets using the first set of network traffic rules to monitor usage of the second set of network traffic rules includes:
    analyzing identified hits and/or associated with the first set of network traffic rules to identify an underutilized network traffic rule.

15. The method of claim 1, further comprising:
    forwarding network traffic information to a network tool communicatively coupled to the network visibility node for processing, the network traffic information including any of:
      at least some of the received plurality of packets; or
      metadata extracted from at least some of the received plurality of packets;
    receiving, in response to the processing, feedback information from the network tool; and
    modifying a particular network traffic rule based on the feedback information.

16. The method of claim 1, further comprising:
    offloading a particular network traffic rule applied at a particular device on the computer network for application at the network visibility node.

17. A system comprising:
   a processing unit;
   a network interface configured to communicatively couple the processing unit to a computer network;
   a storage unit communicatively coupled to the processing unity, the storage unit including a stored first set of network traffic rules configured to be applied to network traffic over the computer network, the network traffic associated with communications among a plurality of devices over the computer network, the plurality of devices not including said system, wherein the stored first set of network traffic rules mirror a second set of network traffic rules to be applied by at least one of the plurality of devices; and
   a memory unit communicatively coupled to the processing unit, the memory unit including instructions stored thereon, which when executed by the processing unit, cause the system to:
      receive, via the network interface, a plurality of packets associated with the network traffic;
      access, from the storage unit, the stored first set of network traffic rules, by performing any one or more of:
         receiving an input including the first set of network traffic rules;
         receiving programming instructions defining the first set of network traffic rules; or
         actively pulling the first set of network traffic rules from any of the plurality of devices applying the network traffic rules; and process the received plurality of packets using the stored first set of network traffic rules to monitor usage of the second set of network traffic rules, by tracking hits and/or misses of the plurality of packets received by the system against the first set of network traffic rules over a period of time;

wherein said system operates out-of-band with the computer network.

18. A network visibility node comprising:

a network port through which to communicate with a computer network; and a processor coupled to the network port, the processor configured to cause the network visibility node to:

receive, via the network port, a plurality of packets associated with network traffic over the computer network, the network traffic associated with communications among a plurality of devices over the computer network, the plurality of devices not including the network visibility node, wherein the network visibility node operates out-of-band with the computer network;

access a first set of network traffic rules configured to be applied to the network traffic, wherein the first set of network traffic rules mirror a second set of network traffic rules to be applied by at least one of the plurality of devices, by performing any one or more of:

receiving an input including the first set of network traffic rules;

receiving programming instructions defining the first set of network traffic rules; or actively pulling the first set of network traffic rules from any of the plurality of devices applying the network traffic rules; and process the received plurality of packets using the first set of network traffic rules to monitor usage of the second set of network traffic rules, by tracking hits and/or misses of the plurality of packets received by the network visibility node against the first set of network traffic rules over a period of time.

* * * * *